United States Patent
Lund et al.

(10) Patent No.: US 6,796,387 B1
(45) Date of Patent: Sep. 28, 2004

(54) POWER DRIVEN EQUIPMENT UTILIZING HYDROGEN FROM THE ELECTROLYSIS OF WATER

(75) Inventors: Bruce D. Lund, Chicago, IL (US); Michael Starrick, Maywood, IL (US)

(73) Assignee: Lund and Company LLC

( * ) Notice: Subject to any disclaimer, the term of this patent is extended or adjusted under 35 U.S.C. 154(b) by 0 days.

(21) Appl. No.: 10/392,415

(22) Filed: Mar. 19, 2003

(51) Int. Cl.[7] .............................................. F02B 43/08
(52) U.S. Cl. ...................... 173/104; 173/170; 173/171; 123/3; 123/306; 227/10; 227/129; 227/156; 60/286; 60/275
(58) Field of Search ................................. 173/104, 114, 173/169, 170, 171; 227/10, 129, 156; 60/286, 275, 273, 284; 123/3, 25 B, 306

(56) References Cited

U.S. PATENT DOCUMENTS

| | | | | |
|---|---|---|---|---|
| 2,673,069 A | * | 3/1954 | Carpenter | 175/93 |
| 4,051,909 A | * | 10/1977 | Baum | 175/93 |
| 4,377,991 A | * | 3/1983 | Liesse | 123/46 SC |
| 4,570,578 A | * | 2/1986 | Peschka et al. | 123/1 A |
| 5,392,740 A | * | 2/1995 | Teramoto et al. | 123/3 |
| 5,799,739 A | * | 9/1998 | Takaada et al. | 173/217 |
| 5,842,623 A | * | 12/1998 | Dippold | 227/10 |
| 6,484,491 B1 | * | 11/2002 | Thordarson | 60/211 |
| 6,571,542 B1 | * | 6/2003 | Fillman et al. | 56/10.6 |

* cited by examiner

Primary Examiner—Scott A. Smith

(57) ABSTRACT

Applicant's novel invention relates to a novel hydrogen generator for supplying hydrogen to drive a hydrogen operated engine. The regulator can supply hydrogen to drive an engine for operating the cutter assembly of a lawnmower as well as supply the output of a hydrogen driven engine to operate a variety of power operated devices such as drills, saws, sanders, etc. In addition, the hydrogen generator can supply hydrogen to operate a power driven piston to drive fasteners.

6 Claims, 4 Drawing Sheets

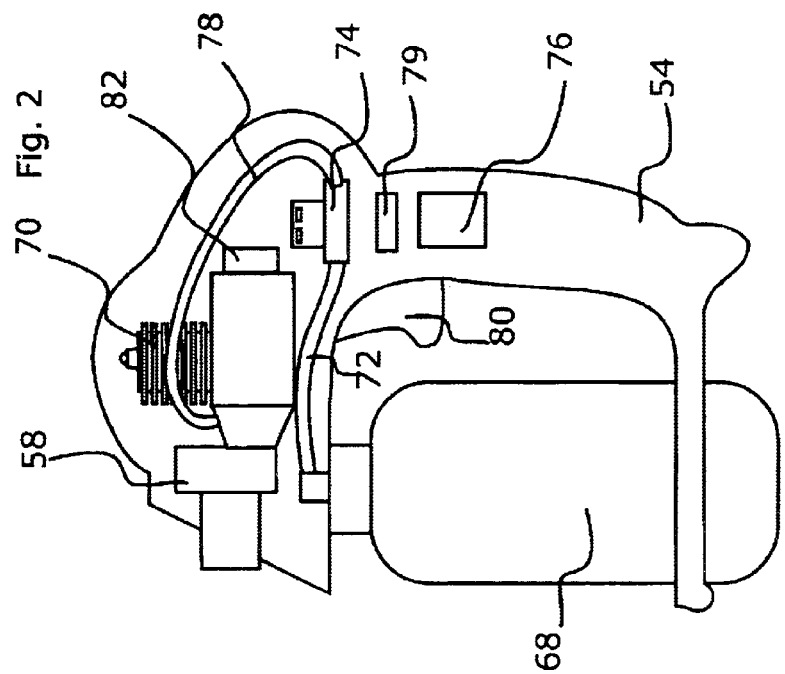
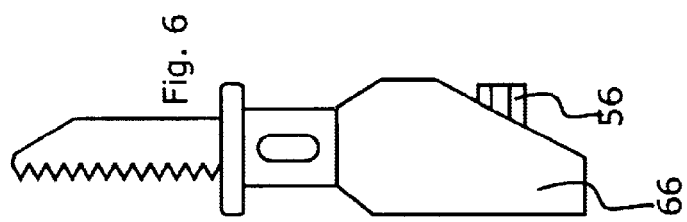
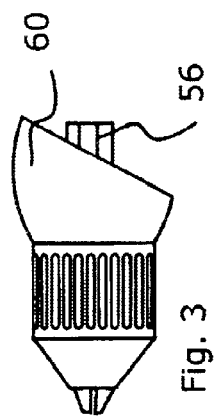
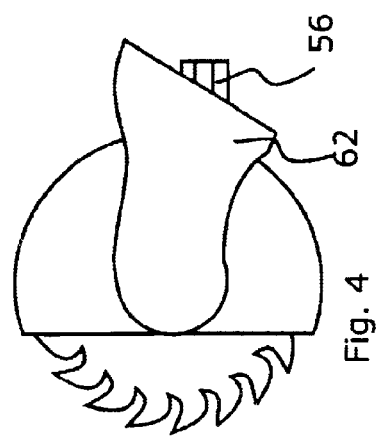
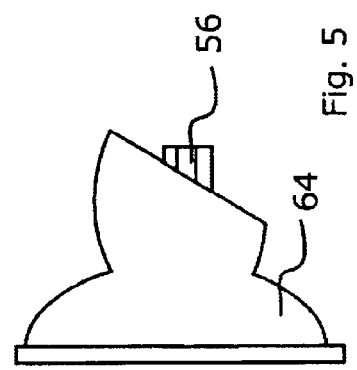

POWER DRIVEN EQUIPMENT UTILIZING HYDROGEN FROM THE ELECTROLYSIS OF WATER

BACKGROUND OF THE INVENTION

The present invention relates generally to a novel hydrogen generator to supply hydrogen to power a variety of devices that are designed to operate on hydrogen as a fuel such as power tools, including nailers, saws, etc., lawnmowers, snow blowers, power driven toys such as rockets or remote controlled vehicles and planes, and other equipment that can be adapted to use hydrogen as a fuel source. The present invention also includes novel combinations of a hydrogen generator of various types with equipment, such as a lawnmower, fastener driving tool, and a mechanism for driving a variety of devices. By eliminating the typical gasoline fueled engines and replacing it with one fueled by hydrogen, environmental polluting gases are no longer created and you have a source of power that is extremely efficient, long lasting, quiet, and inexpensive. Also, when integrating a generator with a variety of equipment, the units so supplied will run very efficiently, can be readily operated in any kind of weather, and will be safe and easy to handle.

SUMMARY OF THE INVENTION

There is illustrated and described herein a unique compact hydrogen generator that takes up a relatively small space and can operate on a readily available home electrical supply. The generator is capable of supplying hydrogen to a hydrogen operated engine or filling a tank with high pressure hydrogen that will serve as fuel for an equipment power source that has been designed to operate with hydrogen. The generator illustrated is only intended to be representative and it can be made whatever size is desired as determined by the rate at which hydrogen is to be generated and the size of the tank to be filled under a predetermined pressure. While a unique hydrogen generator is described and claimed herein, different designs of hydrogen generators can be employed as a unique combination with various types of equipment.

Also illustrated and described herein is a novel lawnmower assembly that has been designed to use hydrogen as a fuel; a novel fastener driving tool that operates on hydrogen as well as a novel hydrogen operated power tool system that can be connected to any number of power driven tools such as a rotating or reciprocating saw, drill or sander.

Other features and advantages will be apparent from the following drawings and descriptions thereof.

BRIEF DESCRIPTION OF THE DRAWINGS

FIG. 2 is a side view of a hydrogen operated tool system that can be used to power various types of equipment as illustrated in FIGS. 3–6 wherein

FIG. 3 is a drill;

FIG. 4 is a circular saw;

FIG. 5 is a sander;

FIG. 6 is a reciprocating saw;

DETAILED DESCRIPTION OF THE DRAWINGS

Figure 1:
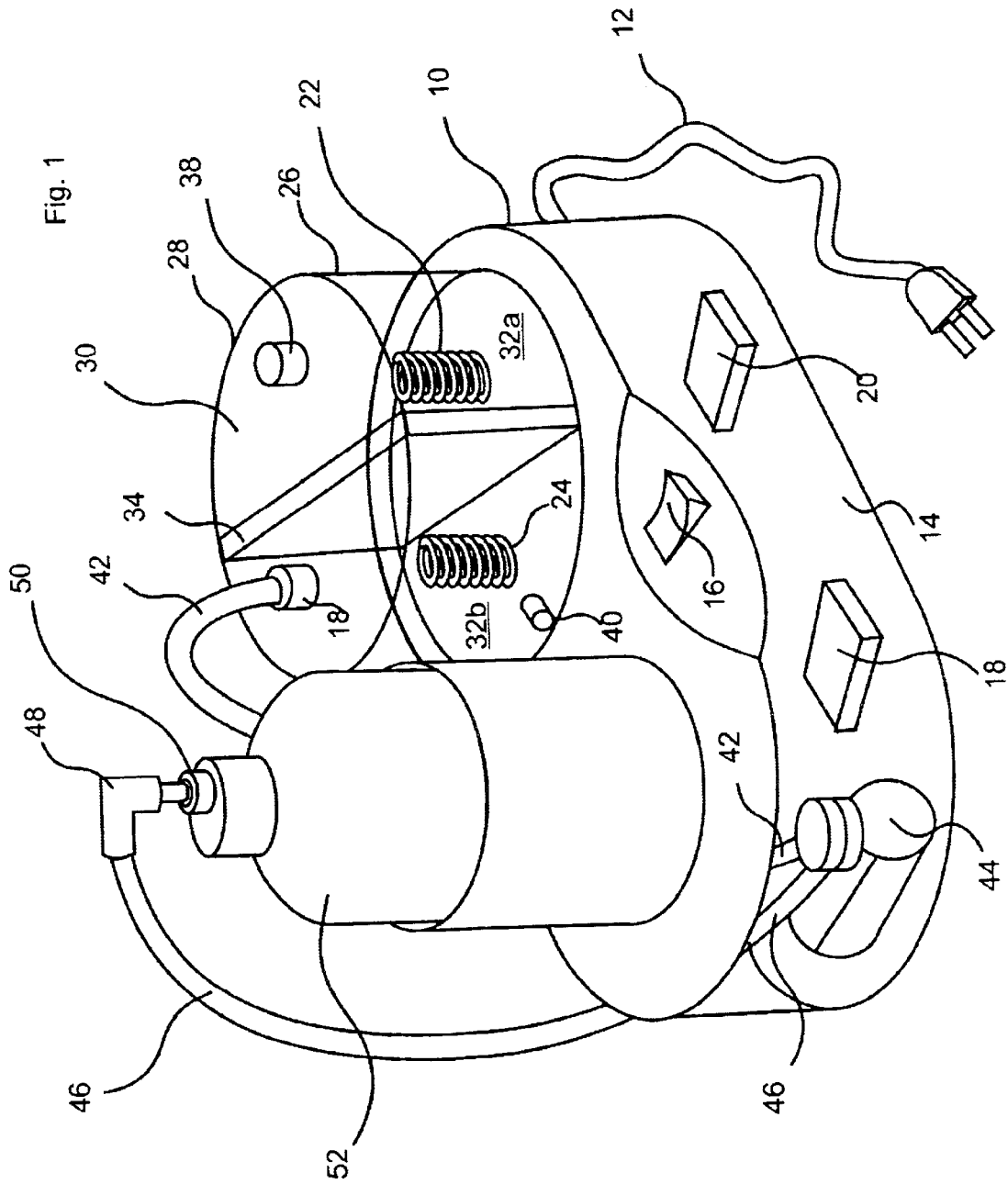
FIG. 1 is a perspective view of a novel hydrogen generator.

Referring now to FIG. 1, there is illustrated applicants novel generator 10 for generating and storing hydrogen which generator is supplied power through a power cord/plug assembly 12. The novel generator 10 is a compact unit adapted to sit on a floor or shelf or to be mounted on equipment that uses hydrogen as a source of engine fuel, such as a lawnmower or snow blower. The generator includes a base housing 14 in which are located a number of components that are schematically illustrated. These include a switch 16 that controls the flow of line voltage to the voltage rectifier 18 and a microprocessor 20. The voltage rectifier 18 supplies DC voltage to the anode 22 and cathode 24 located in the containment vessel 26 fitted into the base housing 14. The containment vessel 26 is in the form of a generally cylindrical housing 28 having a closed top 30. The cylindrical chamber in the containment vessel 26 is divided into 2 generally semi-cylindrical chambers 32a,32b by a non-permeable divider 34 that allows the liquid to flow freely in the bottom portion of the containment vessel 26 for the free flow of electrons between the anode 22 and the cathode 24. This non-permeable divider 34 prevents gas migration once separation has occurred. Located in the chamber is the anode 22 which, when activated, acts to generate oxygen from the water or water and citric acid located in the chamber 32a. A vent 38 is provided in the top wall 30 of this chamber 32a to vent the oxygen therefrom, which vent 38 is controlled by the microprocessor 20.

Located in the chamber 32b is the cathode 24 which, when activated, generates hydrogen from the water in the chamber 32b. When sufficient hydrogen gas is produced by the cathode 24 the liquid level in chamber 32b will be reduced and the liquid level indicator 40 will send a signal to the microprocessor 20 to activate the compressor 44. The hydrogen from the chamber 32b is drawn by the compressor through a low pressure hose 42 that leads to the compressor 44 located in the base housing 14. The hydrogen gas from the low pressure hose 42 is compressed in the compressor 44 and hydrogen gas under a high pressure flows from the compressor 44 into a high pressure hose 46 through a coupler 48 and receptacle 50 in the top of the tank 52. The tank 52 filled with hydrogen gas under pressure can be removed from the generator and used as a source of fuel for any number of mechanisms, including the lawnmower, gun nailer, and portable power tool system for operating saws, drills, etc., as illustrated and described herein.

Another novel development by applicants is the hydrogen power tool system illustrated in FIG. 2. There is shown a power tool assemblage 54 that uses the hydrogen as a source of power for driving a gear system that is designed to be connected to a drive shaft 56 that is part of the ancillary equipment to be operated. The gear system 58 can be connected up to the drive of drill 60 in FIG. 3, the rotating saw 62 of FIG. 4, the sander 64 of FIG. 5 or the reciprocating saw 66 of FIG. 6. These are but representative of tools that can be driven by the hydrogen power system.

The novel hydrogen operated system includes a power tool assembly 54 that, as aforementioned, can be connected to the different output devices illustrated in FIGS. 3–6 to perform their respective work tasks. The power tool assembly 54 includes the refillable storage tank 68 containing hydrogen gas under pressure. The hydrogen operated engine 70 is fed hydrogen through a high pressure line 72 to a solenoid valve 74. The solenoid 74 is controlled by a microprocessor 76 to deliver a predetermined amount of hydrogen gas to the engine 70 through a high pressure hose 78 and actuate a piezo starter 79 or other ignition devices. The input from the rheostat trigger 80 determines the amount of hydrogen gas delivered to the engine 70.

The output from engine 70 is routed through a gear system 58 to increase torque and slow the output of the gear system 58 to device input shaft 56.

The configuration of the power tool assemblage 54 can be such that whenever the rheostat trigger 80 is released the engine 70 will come to a stop by means of the crank position sensor/brake 82 in the correct position for restart. Upon pressing the rheostat trigger 80 again the power tool assemblage 54 can restart the engine 70 to resume work by using a preset program. The microprocessor 76 opens the solenoid valve 74 to allow a predetermined amount of hydrogen gas to flow to the engine 70, and activates the piezo starter 79 to start the engine 70. During operation the output shaft of the gear system 58 is connected up to the input shaft 56 of any of the devices shown in FIGS. 3–6, after which the rheostat trigger 80 is pulled to drive the respective input shaft and associated device.

It can be appreciated that what is provided is a very simple, inexpensive power assemblage that is easy to carry around with the various devices to operate them wherever desired. The engine 70 is environmentally safe and the operator is not subject to the noxious fumes that emanate from a gasoline-fired engine.

It is to be noted that in the case of the aforementioned tool assemblage as well as the lawnmower and fastener driving tool illustrated and disclosed herein, the hydrogen generator employed can be of various types. These include, in addition to the one described in FIG. 1, other forms of hydrogen generators such as a) a hydrocarbon fuel reformer, b) a proton exchange membrane generator, c) a pressure pulse generator wherein no compressor is needed and would include a stop/start generator which collects hydrogen generated under pressure and periodically releases oxygen generated into the atmosphere to maintain low pressure in the generation chamber, and d) a chemical generator utilizing acid/zinc or base/aluminum or a like reaction.

We now turn to the unique and novel hydrogen operated lawnmower 100. The lawnmower 100 uses the environmentally desirable hydrogen as a fuel and the operator is not subject to gas fumes, nor the inconvenience of an electrical cord and, most importantly, it will start right up even in cold weather which is one of the main attributes of a hydrogen powered engine, which is not the situation with gas-fired engines.

Figure 7:
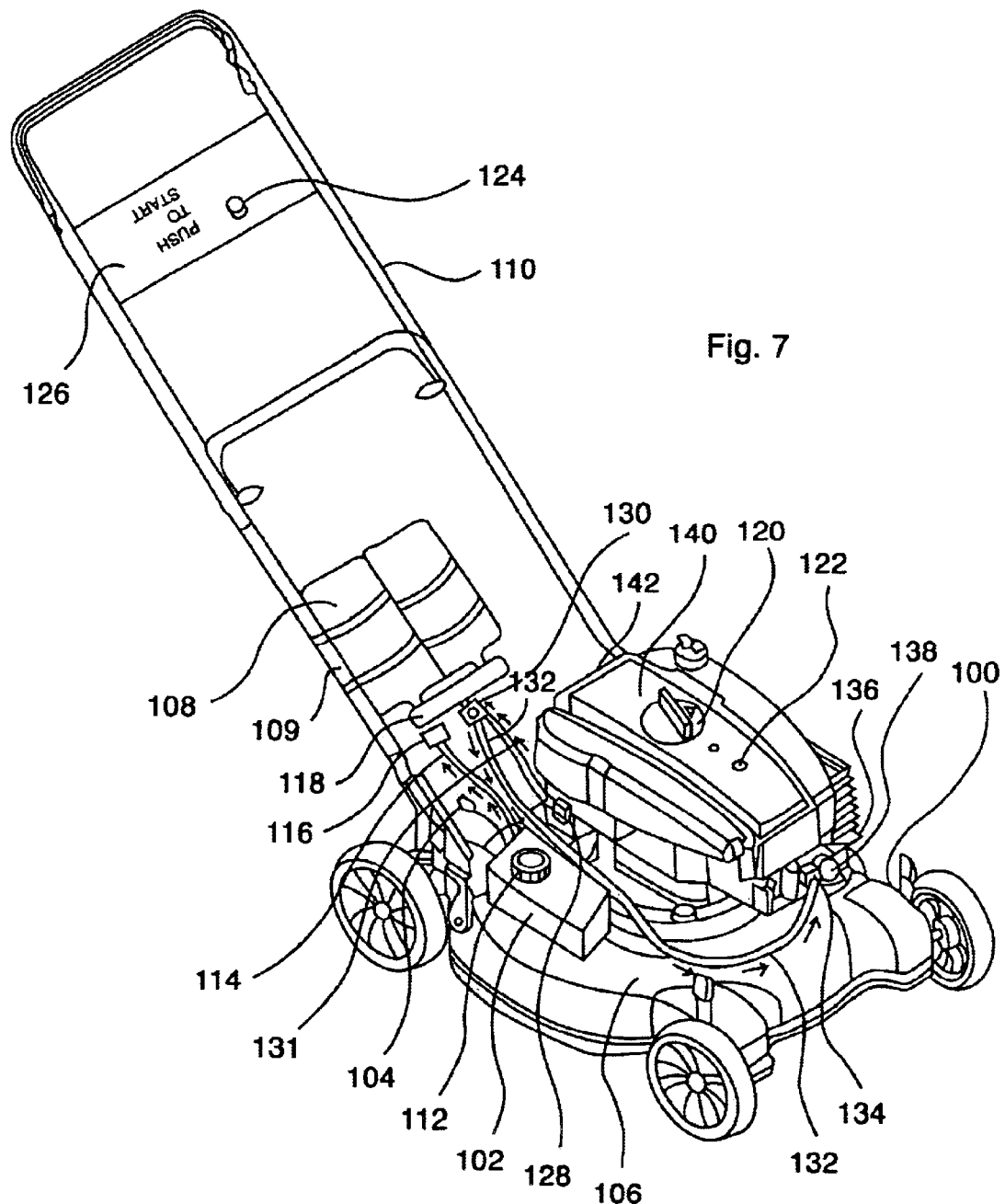
FIG. 7 illustrates a unique hydrogen operated lawnmower.

Referring now to FIG. 7, there is illustrated the novel lawnmower assembly 100 that is supplied hydrogen from the hydrogen generator 102 that is plugged into a 110 volt outlet via the power cord 104 when the lawnmower is in storage to generate a tank of hydrogen under the desired pressure. The generator 102 is schematically illustrated and may be similar in design to that shown in FIG. 1 but it is smaller in scale so it can fit into place on a base portion 106 of the lawnmower assembly 100. It may also be a different type of hydrogen generator as discussed above. The hydrogen generating capacity can be varied but is designed so that overnight it can readily fill the storage tanks 108 for use with the lawnmower assembly 100 the next day if desired. As shown, the tanks 108 are mounted to the frame 109 of the handle portion 110 of the lawnmower assembly 100 so the lawnmower will be capable of operating a minimum of 1–1½ hours without having to recharge the tanks 108. As aforementioned, when describing the novel hydrogen generator 10 illustrated in FIG. 1 the hydrogen is formed by electrolyzing the water located in the chamber containing water or, as in most cases, citric acid will be added to the water to facilitate the operation of the hydrogen generator 102. The water and citric acid is introduced to the generator through a fill cap 112. During the period of time that the generator is operating, the hydrogen gas is liberated from the water and flows through the high pressure supply hose 114, check valve 116, and into fuel tank manifold 118 to storage tanks 108. The generator 102 may include a compressor (not shown) to deliver hydrogen gas at a higher pressure to the storage tanks 108.

The storage tanks 108 will be readily filled overnight with hydrogen gas and the lawnmower is ready to be used to mow the lawn whenever desired thereafter.

To more fully understand the various component parts of the lawnmower and their operation your attention is again directed to FIG. 7.

To start the lawnmower, the starter indicator disk 120 is rotated until the arrows line up and the indicator LED 122 is illuminated. Following this, the start button 124, located in the handle panel 126, is depressed to activate the start sequence. The microprocessor 128 sends a signal to the high pressure solenoid 130 through wires 131 to deliver a prescribed amount of hydrogen gas through the high pressure delivery hose 132 to a high pressure injector 134 located in the cylinder head. Further depression of the start button 124 will activate a piezo crystal (not shown) which will send a high voltage impulse through high tension wire 136 to the spark plug igniter 138 to start the engine.

After the engine starts, the flywheel voltage generator 140 supplies voltage to the microprocessor 128 and high pressure solenoid 130. The engine's hydrogen injection timing is controlled by the microprocessor 128 using data from the flywheel position sensor 142.

Because of the highly combustive nature of hydrogen gas, the microprocessor can be programmed to stop the flow of hydrogen when the wheels stop rolling. This will conserve fuel. This is accommodated due to the ability to readily restart the engine.

Figure 8:
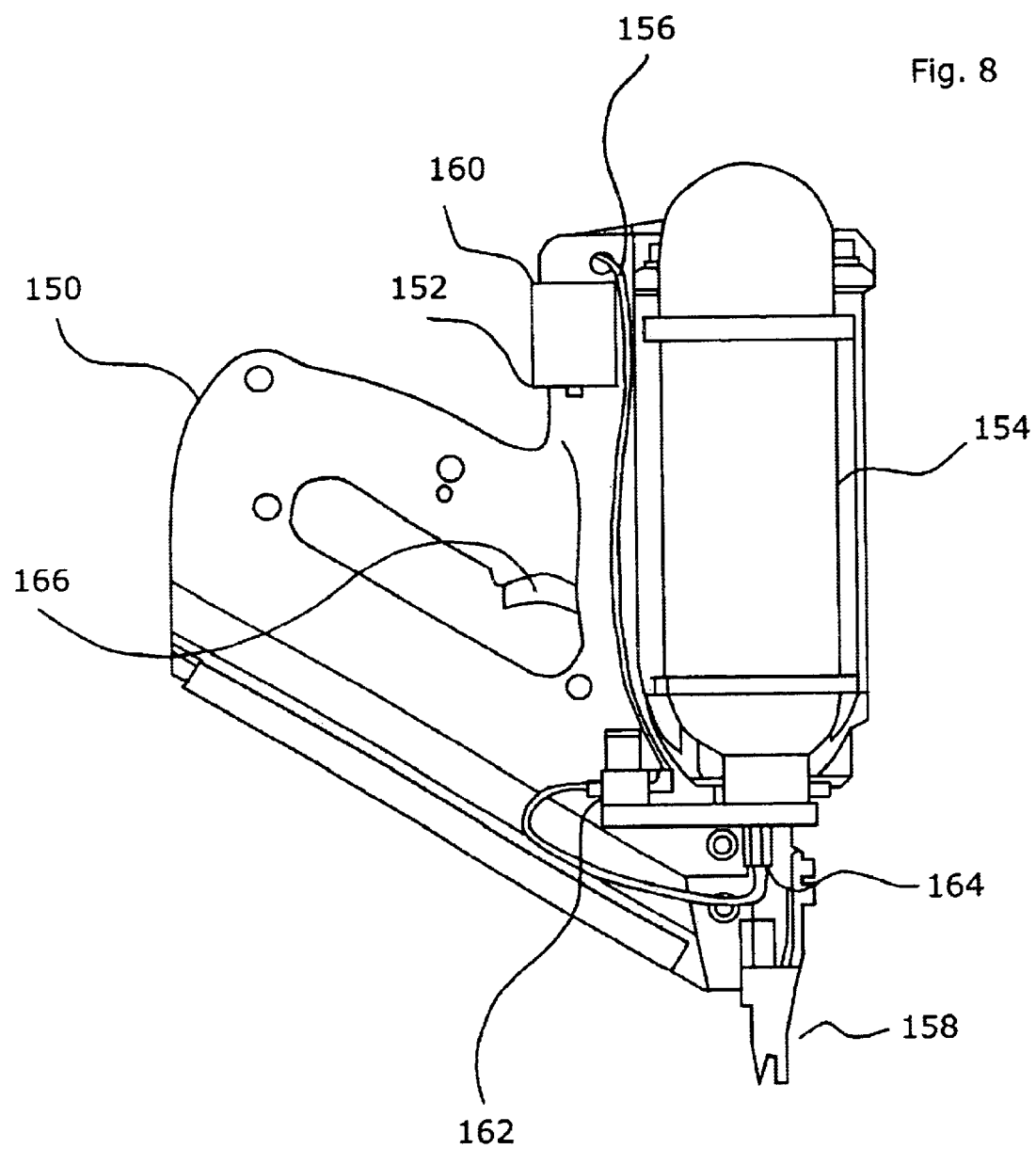
FIG. 8 discloses a novel hydrogen operated fastener driving tool.

We now turn to FIG. 8 which illustrates a hydrogen powered nail gun. The nail gun 150 is turned on by the power switch 152 which supplies battery voltage. The nail driving piston (not shown) has a nail driver (not shown) secured thereto which acts on a nail to drive it into receiving members. Hydrogen can be supplied directly from a hydrogen generator but as illustrated it is supplied from a refillable cylinder 154 through a hose 156 to a chamber above the nail driving piston. When it is desired to operate the gun the user places tool contact point 158 on the work surface and depresses contact point 158 to activate an internal switch (not shown). When the internal switch is activated a signal is sent to the microprocessor 160 which allows voltage to flow to solenoid 162 which is open for a prescribed number of milliseconds. The solenoid 162 opens a valve to allow hydrogen to flow out of the refillable cylinder 154 through high pressure tube 164 through solenoid 162 to supply hose 156.

After the solenoid 162 closes the user can depress piezo igniter 166 which sends a high voltage impulse through a high tension wire (not shown) to a spark point in the piston drive chamber to the hydrogen/air mixture in the driving chamber to drive the piston. The piezo igniter 166 will not fire unless the contact point 158 is depressed and the internal switch has been activated.

It is intended to cover by the appended claims all such embodiments that fall within the true spirit and scope of the invention.

What is claimed:

1. A hydrogen operated power tool assemblage for supplying power to drive power operated tools such as a saw, a drill, a sander, etc. consisting of a portable housing, including a support means and a handle means, a hydrogen supply for fueling an engine, a hydrogen powered engine in said housing, conduit means leading from said hydrogen supply to said engine, valve means for controlling the flow of hydrogen to said engine, and means for controlling the amount of hydrogen gas delivered to the engine and a drive shaft operated by said engine to operate a power operated tool connected thereto.

2. A hydrogen operated power tool assemblage as set forth in claim 1 in which the hydrogen supply for fueling an engine is provided by a hydrogen generator.

3. A hydrogen operated power tool assemblage as set forth in claim 1 in which the hydrogen is supplied by means of a storage tank for hydrogen under pressure supported by said support means.

4. A power tool assemblage as set forth in claim 1 that includes a crank position sensor/brake and a trigger means that includes a means of adjusting engine speed and when released the engine will come to a stop by means of the crank position sensor/brake in the correct position for restart.

5. A power tool assemblage as set forth in claim 4 so that when the trigger means is fully depressed after the engine stops in the correct position for restart, acts to send a high voltage to a spark igniter device to restart the hydrogen operated engine.

6. A power tool assemblage as set forth in claim 4 that includes a gear system to increase torque and slow the output of the gear system to the input shafts of the power tool it is intended to operate.

* * * * *